US008516463B2

(12) United States Patent
Oliva

(10) Patent No.: US 8,516,463 B2
(45) Date of Patent: Aug. 20, 2013

(54) MECHANISM FOR ALLOCATING STATEMENT FRONTIER ANNOTATIONS TO SOURCE CODE STATEMENTS

(75) Inventor: Alexandre Oliva, Campinas (BR)

(73) Assignee: Red Hat, Inc., Raleigh, NC (US)

( * ) Notice: Subject to any disclaimer, the term of this patent is extended or adjusted under 35 U.S.C. 154(b) by 382 days.

(21) Appl. No.: 12/789,713

(22) Filed: May 28, 2010

(65) Prior Publication Data

US 2011/0296389 A1  Dec. 1, 2011

(51) Int. Cl.
*G06F 9/45* (2006.01)
(52) U.S. Cl.
USPC ............................ 717/151; 717/154; 717/159
(58) Field of Classification Search
None
See application file for complete search history.

(56) References Cited

U.S. PATENT DOCUMENTS

| | | | | |
|---|---|---|---|---|
| 6,874,140 | B1 * | 3/2005 | Shupak | 717/131 |
| 7,120,906 | B1 * | 10/2006 | Stephenson et al. | 717/159 |
| 7,401,328 | B2 * | 7/2008 | Lu | 717/159 |
| 7,788,650 | B2 * | 8/2010 | Johnson et al. | 717/151 |
| 7,873,951 | B1 * | 1/2011 | Bissett et al. | 717/151 |
| 8,132,162 | B2 * | 3/2012 | Peterson | 717/154 |
| 8,214,813 | B2 * | 7/2012 | Harris et al. | 717/159 |
| 2003/0088860 | A1 * | 5/2003 | Wang | 717/153 |
| 2004/0015921 | A1 * | 1/2004 | Daynes et al. | 717/154 |
| 2005/0097535 | A1 * | 5/2005 | Plum | 717/151 |
| 2006/0277456 | A1 * | 12/2006 | Biberstein et al. | 715/512 |
| 2008/0172662 | A1 * | 7/2008 | Harris et al. | 717/159 |
| 2009/0106744 | A1 * | 4/2009 | Li et al. | 717/151 |
| 2010/0192138 | A1 * | 7/2010 | Leung et al. | 717/151 |
| 2010/0325620 | A1 * | 12/2010 | Rohde et al. | 717/154 |
| 2011/0231829 | A1 * | 9/2011 | MacLeod et al. | 717/159 |

OTHER PUBLICATIONS

Alexandre Oliva, "Consistent Views at Recommended Breakpoints", GNU 2012 summit, pp. 1-6, Red Hat; <http://gcc.gnu.org/wiki/summit2010?action=AttachFile&do=get&target=oliva.pdf>.*
Kellens et al., "Co-evolving Annotations and Source Code through Smart Annotations", 2010 IEEE, CSMR.2010.20, pp. 117-126; <http://ieeexplore.ieee.org/stamp/stamp.jsp?tp=&arnumber=5714426>.*
Kajsa et al., "Design Pattern Support Based on the Source Code Annotations and Feature Models", Springer-Verlag Berlin Heidelberg 2012, SOFSEM 2012, LNCS 7147, pp. 467-478; <http://link.springer.com/content/pdf/10.1007%2F978-3-642-27660-6_38>.*
Noguera et al., "Tackling Pointcut Fragility with Dynamic Annotations", 2010 ACM, ECOOP'2010 Maribor, Solvenia EU, pp. 1-6; <http://dl.acm.org/citation.cfm?doid=1890683.1890684>.*

* cited by examiner

*Primary Examiner* — Thuy Dao
*Assistant Examiner* — Ben C Wang
(74) *Attorney, Agent, or Firm* — Lowenstein Sandler LLP

(57) ABSTRACT

A mechanism for allocating statement frontier annotations to source code statements of a software program is disclosed. A method of embodiments of the invention includes generating statement frontier annotations during translation of source code statements of a software program on a computer system. The method further includes allocating the statement frontier annotations to the source code statements, wherein a statement frontier annotation indicates a frontier of a source code statement to which the statement frontier annotation is allocated.

20 Claims, 6 Drawing Sheets

MECHANISM FOR ALLOCATING STATEMENT FRONTIER ANNOTATIONS TO SOURCE CODE STATEMENTS

TECHNICAL FIELD

The embodiments of the invention relate generally to compiler optimization and, more specifically, relate to a mechanism for allocating statement frontier annotations to source code statements of a software program.

BACKGROUND

In software compilation, a high-level programming language-based source code of a software program is transformed into a low-level language-based machine code so that the software program can become an executable program. It is well-known to translate a source code statement of a source program into compiler internal statements and annotation (e.g., binding annotation). However, during compilation, these computer internal statements and annotations get shuffled without having a point of reference with respect to each other or providing a recognized point indicating the end or completion of their corresponding source code statements, and/or the beginning of source code statements.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Embodiments of the invention provide for allocating statement frontier annotations to source code statements of a software program is disclosed. A method of embodiments of the invention includes generating statement frontier annotations during translation of source code statements of a software program on a computer system. The method further includes allocating the statement frontier annotations to the source code statements, wherein a statement frontier annotation indicates a frontier of a source code statement to which the statement frontier annotation is allocated.

A method of embodiments of the invention further includes generating beginning-of-statement annotations during translation of source code statements of a software program on a computer system. The method further includes allocating the beginning- and/or end-of-statement annotations to the source code statements, wherein a beginning-of-statement annotation indicates the beginning of a source code statement to which the end-of-statement annotation is allocated, and an end-of-statement annotation indicates an end of a source code statement to which the beginning-of-statement annotation is allocated. Different embodiments of the invention may choose either one, or both, although the end of one statement denotes the same program location as the beginning of the subsequent statement. Because of the near-equivalence as well as for brevity and simplicity, for most of the remainder of this document, merely end-of-statement annotations are discussed and referenced throughout this document, but it is to be noted and understood that a beginning-of-statement annotation could have been issued instead of or in addition to the end-of-statement annotation.

The embodiments of the invention are used to improve software compilation process that includes translating a source code into a machine code. In one embodiment, end-of-statement annotations are allocated to source code statements indicating the end of the source code statements. In other words, an end-of-statement annotation, when allocated to a source code statement, provides a recognized point as the end or completion of the source code statement. Further, this end-of-statement annotation is allocated such that it remains in a fixed location with respect to or in reference to other end-of-statement annotations, and other binding annotations of that or of other source code statements. This location of the end-of-statement annotation remains fixed with respect to the corresponding binding annotation throughout the compilation process even if the corresponding binding annotation is updated or amended, as necessary. The aforementioned techniques are beneficial for performing debugging of the source code.

Figure 1:
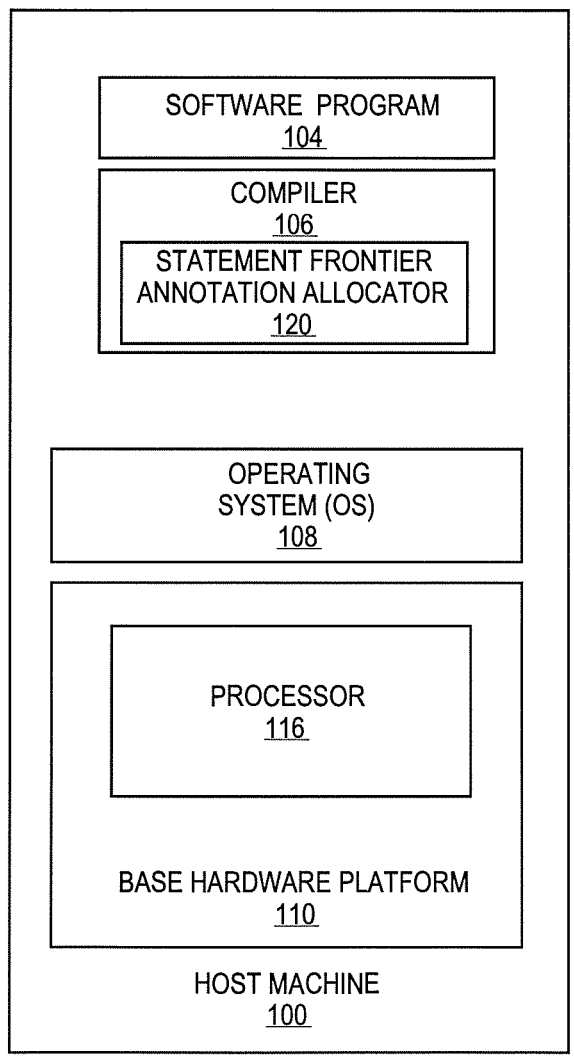
FIG. 1 illustrates a host machine for employing a statement frontier annotation allocator for allocating standalone statement frontier annotations to source code statements of a source code of a software program according to one embodiment of the invention.

FIG. 1 illustrates a host machine 100 for employing a statement frontier annotation allocator 120 ("SF annotation allocator") for allocating standalone statement frontier annotations to source code statements ("source statements") of a source code of a software program 104 according to one embodiment of the invention. In one embodiment, a statement frontier annotation includes a standalone annotation that provides information regarding the beginning and/or completion of a source statement to which it is allocated. In one embodiment, a statement frontier annotation includes a beginning-of-statement annotation representing the start or beginning of source statement or an end-of-statement annotation representing the end or completion of a source statement. Stated differently, statement frontier annotation, such as beginning-of-statement annotation and/or end-of-statement annotation, represents the frontier or boundary, such as start and/or end of its corresponding source statement of the software program 104. For example, an end-of-statement annotation includes a brief description (e.g., end stmt, statement completed, done, etc.) to identify the end or completion of its corresponding source statement, while a beginning-of-statement annotation includes a brief description (e.g., start stmt, statement started, start, etc.) to identify the start or beginning of its corresponding source statement.

Further, in one embodiment, a statement frontier annotation remains fixed with respect to any binding annotation of the corresponding source statement. Stated differently, a statement frontier annotation remains fixed in relevance to its corresponding binding annotation regardless of the compilation-related movement of other compiler internal statements ("compiler statements") or line number annotations of the source statement and even in those cases when a binding annotation is changed (e.g., updated) in a later stage of the compilation process. A binding annotation is prevented from being moved around with respect to its corresponding statement frontier annotation. These are illustrated and further discussed with respect to the subsequent Figures. Further, statement frontier annotations and binding annotations may behave like a compiler statement. As aforementioned, a statement frontier may include a beginning-of-statement annotation and/or an end-of-statement annotation representing and identifying the beginning and/or end of a source statement of software program 104; however, for brevity, clarity and ease of understanding, in most of the remainder of this document, only the end-of-statement is discussed.

Host machine 100 includes a base hardware platform 110 that comprises a computing platform, which may be capable, for example, of working with a standard operating system ("OS") 108. Operating system 108 serves as an interface between any hardware or physical resources of the host machine 100 and the user. In some embodiments, base hardware platform 110 may include a processor 116, memory devices, network devices, drivers, and so on.

Host machine 100 further hosts a compiler 106 for compilation of source codes into machine codes, such as transforming the source code of the software program 104 from a high-level programming language or source language (e.g., C, C++, etc.) to a lower level language or object code (e.g., machine code, assembly language, etc.) such that the software program 104 can become an executable program. As aforementioned, the compiler 106 includes a software tool for transforming the software program 104 written with a high-level programming language into a low level machine code understandable by a computer system. Compiler optimizing is aimed at making the result of such transformation as efficient as possible.

In one embodiment, the SF annotation allocator 120 generates and allocates an end-of-statement annotation to each source statement of the source code of the software program 104 as part of the process of translating or transforming source statements of the source code into various compiler statements and annotations. It is contemplated that an end-of-statement annotation may contain any type or number of description statements relating to the source statement to which it is allocated. For example, a description may refer to the end or completion of the corresponding source statement, such as "done", "statement process completed", etc. End-of-statement annotations (including their content and location, such as their fixed location with respect to binding annotations) can be beneficial for debugging purposes to be used by debugger software or a user (e.g., software developer, software programmer, system administrator, etc.). Typically, debugging refers to a process of finding and reducing the number of errors, defects, or bugs of a computer program 104. As aforementioned, beginning-of-statement annotations may also be generated and allocated instead of or in addition to the end-of-statement annotations and thus, it is to be noted that SF annotation allocator 120 is not limited to merely generating and allocating end-of-statement annotations and that it is also capable of generating and allocation beginning-of-statement annotations.

Figure 2:
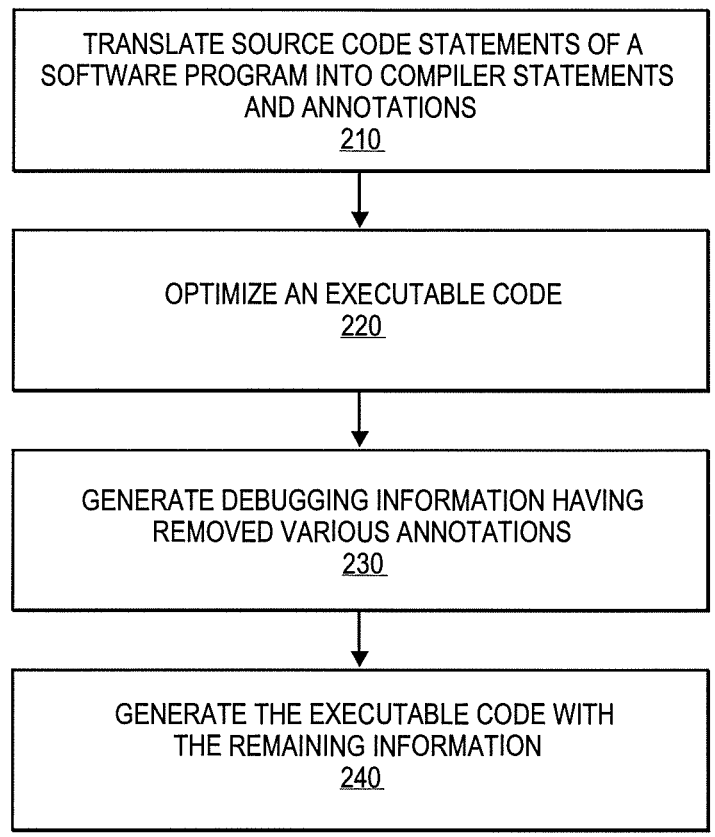
FIG. 2 illustrates a method for transforming a source code according to one embodiment of the invention.

FIG. 2 illustrates a method for transforming a source code according to one embodiment of the invention. Method 200 may be performed by processing logic that may comprise hardware (e.g., circuitry, dedicated logic, programmable logic, microcode, etc.), software (such as instructions run on a processing device), or a combination thereof, such as firmware or functional circuitry within hardware devices. In one embodiment, method 200 is performed by SF annotation allocator of FIG. 1.

Method 200 begins at block 210 where each source statement of a software source code is translated into compiler statements and annotations. This includes lowering complex statements into atomic statements, generating and allocating binding annotations to source statements, and further, in one embodiment, generating and allocating end-of-statement annotations to the source statements. In one embodiment, as performed by the SF annotation allocator of FIG. 1, an end-of-statement annotation is allocated to a source statement such that it points out the end of the source statement to which it is allocated and remains fixed in location with respect to the binding annotation allocated to the source statement.

At block 220, an executable code is optimized, which may include updating the binding annotation, as necessary. However, even the updated binding annotation is not moved with respect to the end-of-statement annotation and vice versa. At block 230, debugging information is generated. Here, for example, various annotations are removed from the code stream. At block 240, the executable code is generated out of the remaining information. Further, debugging information is generated and provided such that a debugger can determine what is going on at the machine and whether the machine is doing what it ought to be doing.

Figure 3:
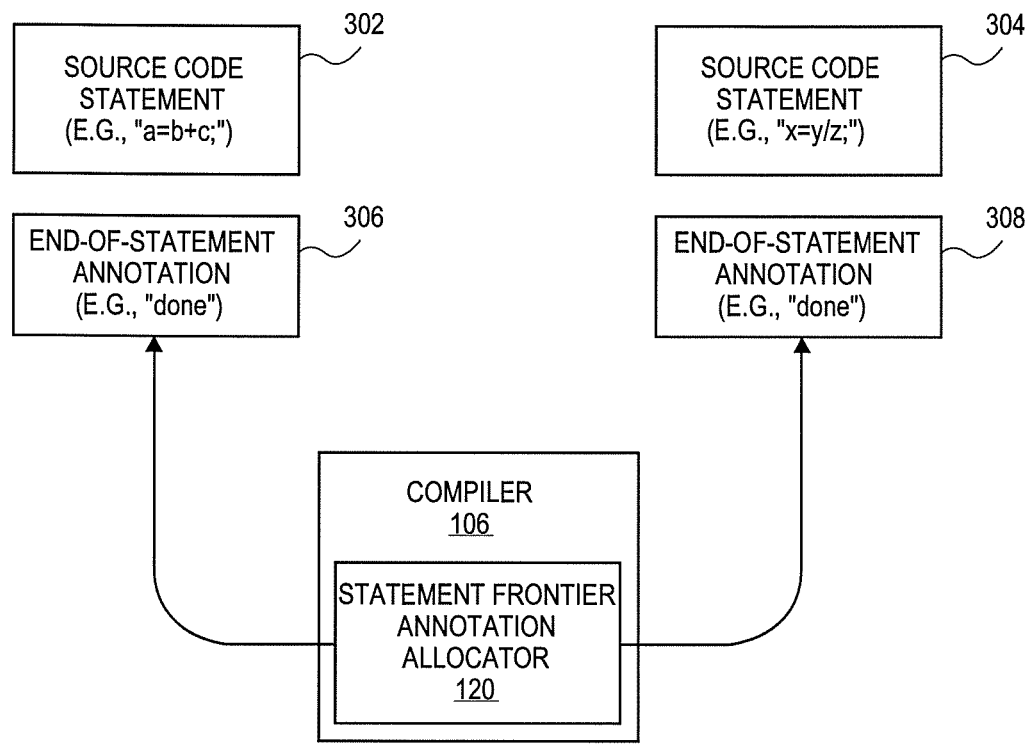
FIG. 3 illustrates allocation of end-of-statement annotations to source code statements of a software program according to one embodiment of the invention.

FIG. 3 illustrates allocation of end-of-statement annotations to source code statements of a software program according to one embodiment of the invention. Two exemplary source statements 302, 304 of a software program are illustrated as being compiled by a compiler 106. In one embodiment, two end-of-statement annotations 306, 308 are generated and then allocated to the source statements 302, 304 by the SF annotation allocator 120. Further, each source statement 302, 304 may include a binding annotation which, in one embodiment, is prevented from moving around with respect to the corresponding end-of-statement annotation 306, 308 even if, for example, the binding annotation is updated, as necessary, and as other compiler statements move about during the compilation process.

Figure 4:
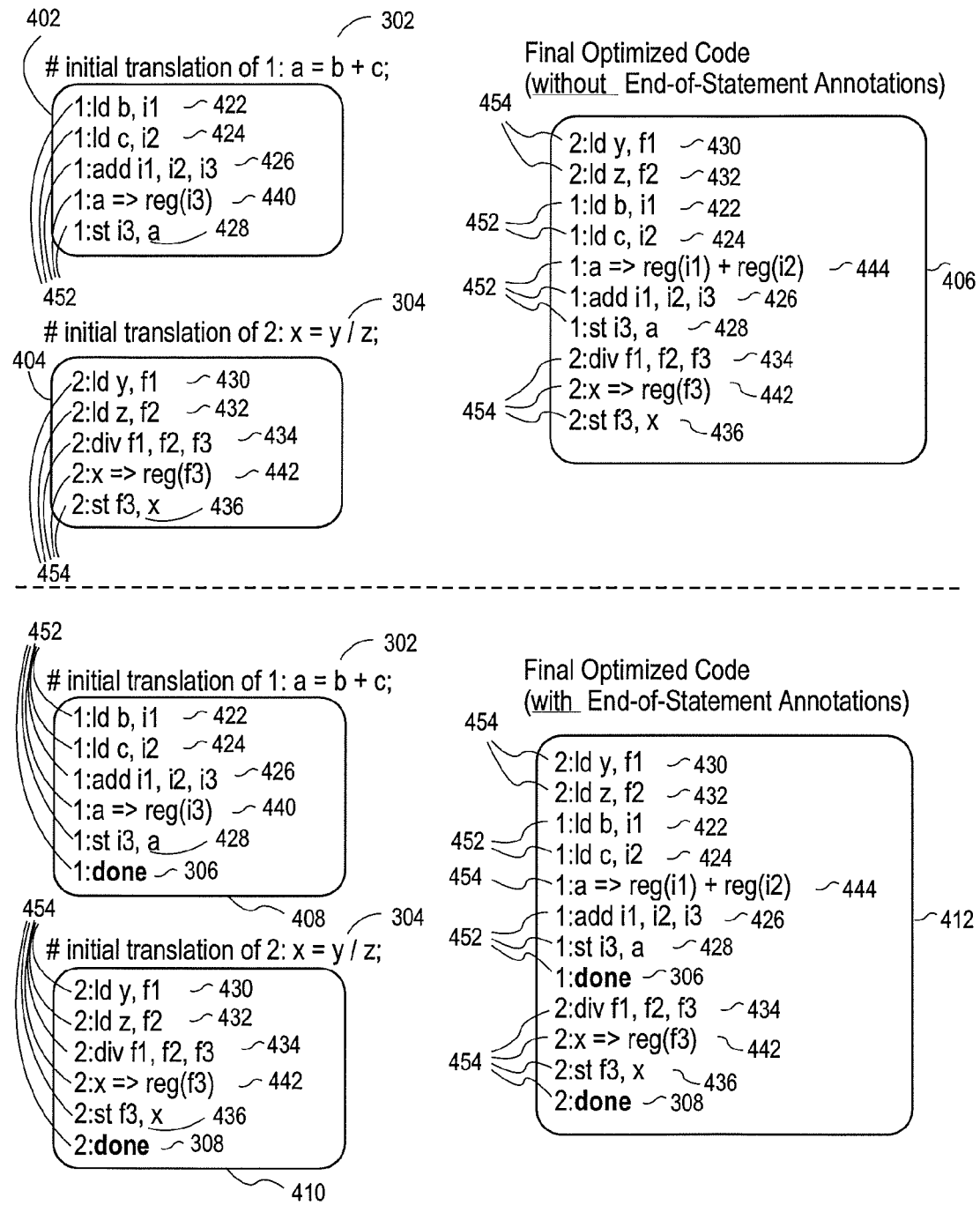
FIG. 4 illustrates allocation of end-of statement annotations to source code statements of a software program according one embodiment of the invention.

FIG. 4 illustrates allocation of end-of statement annotations to source code statements of a software program according to one embodiment of the invention. Two exemplary source statements 302 (e.g., a=b+c;), 304 (e.g., x=y/z) of a software source code are being compiled into a machine code by a compiler of a computer system. Translations 402 and 404 of source statements 302 and 304, respectively, illustrate various compiler statements 422-428 and 430-436 and binding annotations 440, 442 that act as compiler statements. Translations 402, 404 further illustrate line number annotations 452, 454.

Since these translations 402, 404 do not include any end-of-statement annotations, their final optimized code 406 provides the optimized version of their source statements 302, 304 without the end-of-statement annotations. Final optimized code 406 illustrates how compiler statements 422-428, 430-436 and the line number annotations attached to them 452, 454 are shuffled during compilation of source statements 302, 304. For example, compiler statement ld y, f1 430 (e.g., load y into register f1) having allocated a line number annotation of 2 454 (being part of the translated source statement 304) is shown leading the final optimized code 406 as being ahead of compiler statement ld b, i1 422 (e.g., load b into register i1) having allocated line number annotation of 1 452 (being part of source statement 302). As a further example, compiler statement 426 was moved past the binding annotation 440, that was adjusted to compensate. As illustrated and aforementioned, this final optimization code 406 does not contain any end-of-statement annotations and thus reflects the complexity of the shuffling of compiler statements 422-428, 430-436 and line number annotations 452, 454. It is contemplated that these source statements 302, 304 and their translations 402, 404 and their final optimized code 406 are intentionally kept simple for brevity and clarity and that the actual source code can be much longer and complicated.

Now referring to translations 408, 410, in one embodiment, end-of-statement annotations 306 and 308 (e.g., done) are allocated to source statements 302 and 304, respectively. Each end-of-statement annotation 306 and 308 provides information about the end or completion of its corresponding source statement 302, 304. For example, end-of-statement annotation 306 (being assigned line number annotation 1 452) provides end of the statement information about source statement 302 to which is allocated. This is further reflected in final optimized code 412. In this case, as opposed to the final optimized code 406 without any end-of-statement annotations, end-of-statement annotations 306 and 308 are present and indicate the end of their corresponding source statements 302 and 304, respectively, despite the shuffle and movement of other compiler statements 422-428, 430-436, line number annotations 452, 454, and the like.

Furthermore, in one embodiment, each end-of-statement annotation 306, 308, which acts as a compiler statement, is allocated to its corresponding source statement 302, 304 such that it remains in a fixed location (as a point of reference) with respect to its corresponding binding annotation 440, 442. For example, binding annotation 442 of source statement 304 is prevented from moving about with reference to any end-of-statement annotations 306, 308 and thus both annotations 442, 308 remain fixed in location with respect to each other as illustrated both in translation 410 and final optimized code 412. Further, in one embodiment, binding annotation 440 of source statement 302 remains fixed in location with respect to end-of-statement annotation 308 even when (as necessary) the corresponding binding annotation 440 is updated into another binding annotation 444 as illustrated in translation 408 and final optimized code 412.

It is contemplated that the description of end-of-statement annotations 306, 308 or beginning-of-statement annotations is not limited to "done" (which is used here for brevity and simplicity) or "start" and that it may contain any kind or length of description to provide information regarding the corresponding source statements 302, 304. The description may include "begin stmt, previous stmt completed", "end of current stmt, ready to start the next", "stmt completed, subsequent stmt starts", or the like.

Figure 5:
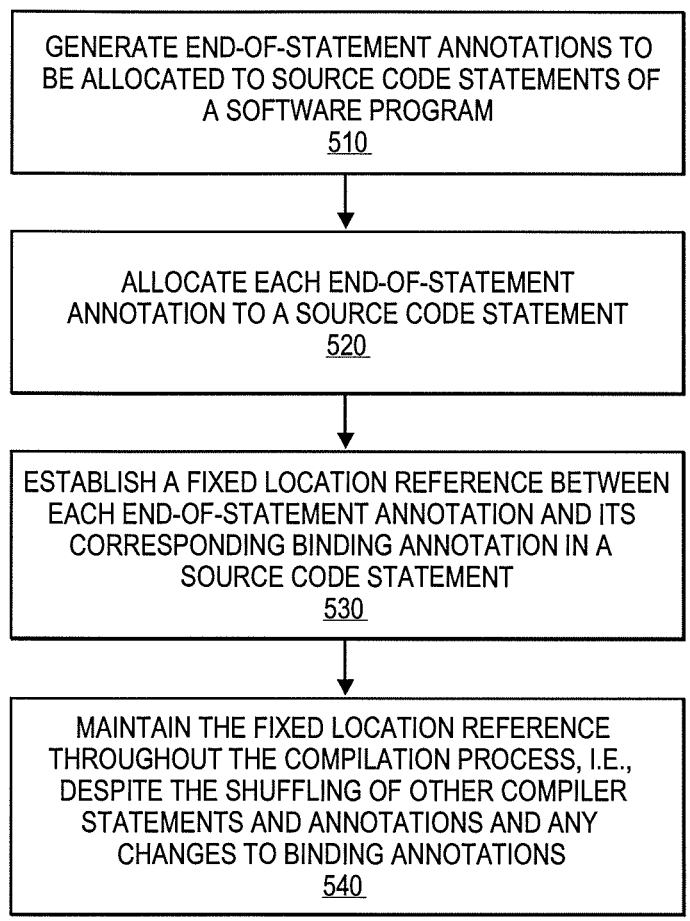
FIG. 5 illustrates a method for allocating end-of-statement annotations to source code statements of a source code of a software program according to one embodiment of the invention.

FIG. 5 illustrates a method for allocating end-of-statement annotations to source code statements of a source code of a software program according to one embodiment of the invention. Method 500 may be performed by processing logic that may comprise hardware (e.g., circuitry, dedicated logic, programmable logic, microcode, etc.), software (such as instructions run on a processing device), or a combination thereof, such as firmware or functional circuitry within hardware devices. In one embodiment, method 500 is performed by SF annotation allocator of FIG. 1.

Method 500 begins at block 510 where the SF annotation allocator at a compiler of a computer system generates end-of-statement annotations to be allocated to source statements of the program source code during translation of the source statements. At block 520, each generated end-of-statement annotation is then allocated to a corresponding source statement and is used to indicate the end or completion (e.g., "done", "end of stmt", etc.) of its corresponding source statement, in one embodiment. At 530, a fixed location as a point of reference is established between each end-of-statement annotation and its corresponding binding annotation of a source statement to which both the end-of-statement annotation and the binding annotation are allocated. At processing block 540, in one embodiment, this fixed location reference between the end-of-statement annotation of source statement and its corresponding binding annotation of that source statement is maintained throughout the compilation process during which other compiler statements and annotations of the source statement may move about with respect to each other. Further, this fixed location reference between the end-of-statement annotation and the binding annotation is continuously maintained even if changes (such as any necessary updates) are made to the binding annotation.

Figure 6:
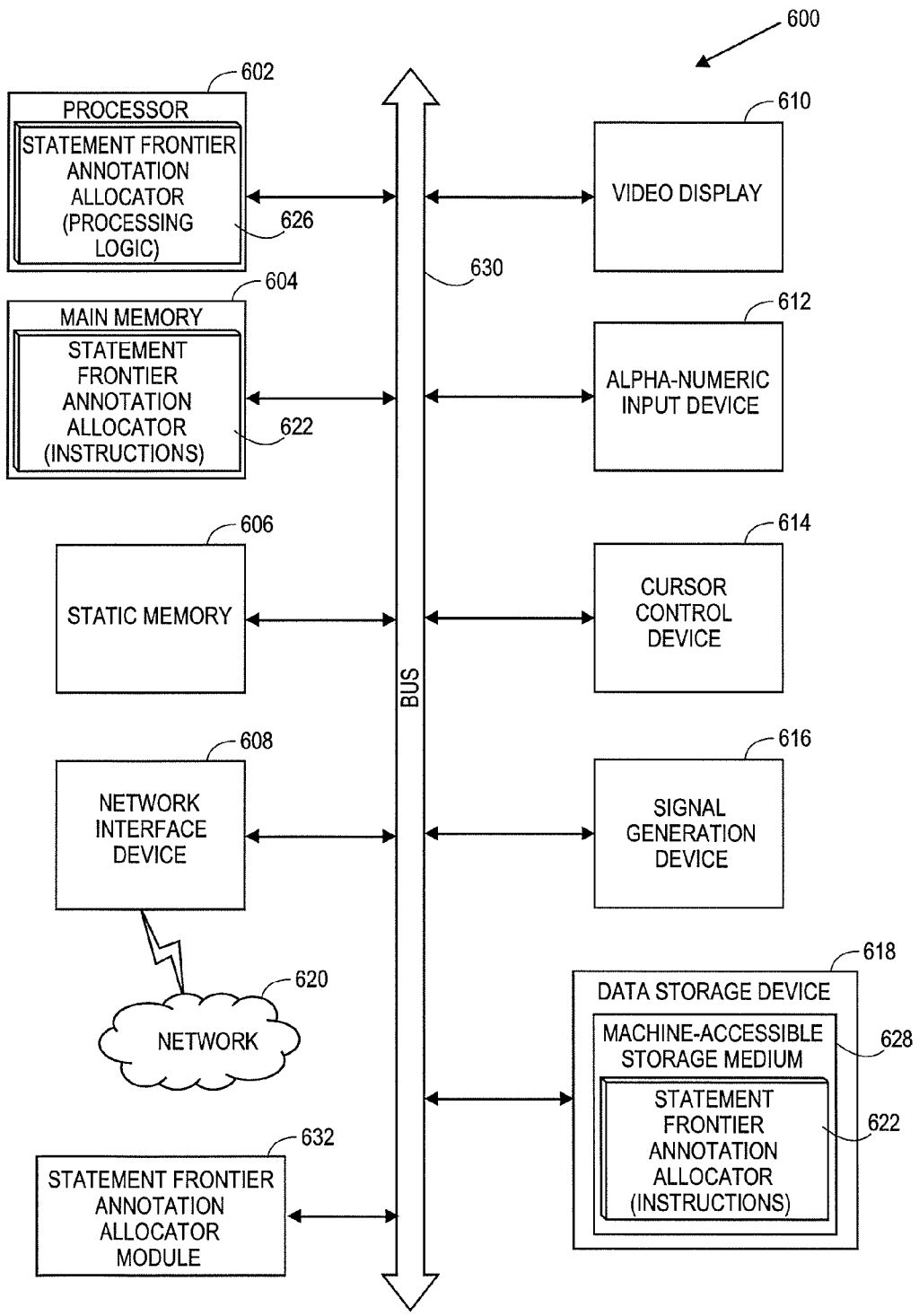
FIG. 6 illustrates one embodiment of a computer system.

FIG. 6 illustrates a computer system 600 for performing statement frontier annotation allocation according to one embodiment of the invention. Within the computer system 600 is a set of instructions for causing the machine to perform any one or more of the methodologies discussed herein. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing device 602, a main memory 604 (e.g., read-only memory (ROM), flash memory, random access memory (RAM), dynamic RAM (DRAM) such as synchronous DRAM (SDRAM), DRAM (RDRAM), etc.), a static memory 606 (e.g., flash memory, static random access memory (SRAM), etc.), and a secondary memory 618 (e.g., a data storage device in the form of a drive unit, which may include fixed or removable machine-accessible or computer-readable storage medium), which communicate with each other via a bus 630.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. Processing device 602 is configured to execute the processing logic 626 for performing the operations and methods discussed herein.

The computer system 600 may further include a network interface device 608. The computer system 600 also may include a video display unit 610 (e.g., a liquid crystal display (LCD) or a cathode ray tube (CRT)) connected to the computer system through a graphics port and graphics chipset, an alphanumeric input device 612 (e.g., a keyboard), a cursor control device 614 (e.g., a mouse), and a signal generation device 616 (e.g., a speaker).

The data storage device 618 may include a machine-accessible storage medium (or a computer-readable storage medium) 628 on which is stored one or more sets of instructions 622 (e.g., SF annotation allocator) embodying any one or more of the methodologies or functions described herein. The SF annotation allocator may also reside, completely or at least partially, within the main memory 604 (e.g., SF annotation allocator (instructions) 622) and/or within the processing device 602 (e.g., SF annotation allocator (processing logic) 626) during execution thereof by the computer system 600, the main memory 604 and the processing device 602 also constituting machine-readable storage media. Further, for example, the SF annotation allocator instructions 622 may be transmitted or received over a network 620 via the network interface device 608.

The machine-readable storage medium 628 may also be used to store the SF annotation allocator (instructions) 622 persistently. While the machine-accessible storage medium 628 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

SF annotation allocator modules 632, components and other features described herein (for example in relation to FIG. 1) can be implemented as discrete hardware components or integrated in the functionality of hardware components such as ASICS, FPGAs, DSPs or similar devices. In addition, the modules 632 can be implemented as firmware or functional circuitry within hardware devices. Further, the modules 632 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "generating", "allocating", "establishing", "maintaining", "continuing", "translating", "transforming", "optimizing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including floppy disks, optical disks, magnetic-optical disks, ROMs, compact disk ROMs (CD-ROMs), RAMs, erasable programmable ROMs (EPROMs), electrically EPROMs (EEPROMs), magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., ROM, RAM, magnetic disk storage media, optical storage media, flash memory devices, etc.), a machine (e.g., computer) readable transmission medium (non-propagating electrical, optical, or acoustical signals), etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A computer-implemented method comprising:
    generating, by a processing device, a plurality of statement frontier annotations during translation of source code statements of a software program executed by the processing device for a compilation process;

allocating, by the processing device, the plurality of statement frontier annotations to the source code statements, wherein each of the plurality of statement frontier annotations comprises information indicating at least one of a beginning or an end of a source code statement to which the statement frontier annotation is allocated; and allocating, by the processing device, binding annotations to the source code statements during the translation of the source code statements, wherein the plurality of statement frontier annotations are fixed in location with respect to the information and corresponding binding annotations during the compilation process comprising at least one of amending or updating the corresponding binding annotation.

2. The computer-implemented method of claim 1, wherein each of the plurality of statement frontier annotations comprises a beginning-of-statement annotation or an end-of-statement annotation.

3. The computer-implemented method of claim 2, wherein the beginning-of-statement annotation indicates the beginning.

4. The computer-implemented method of claim 2, wherein the end-of-statement annotation indicates the end.

5. The computer-implemented method of claim 1, wherein the allocating comprises establishing a fixed reference location between a statement frontier annotation and the corresponding binding annotation of a source code statement to which the statement frontier annotation and the binding annotation are allocated.

6. The computer-implemented method of claim 5, further comprising maintaining the fixed reference location by preventing the binding annotation from moving about with reference to the statement frontier annotation, while other compiler internal statements of the source code statement move about.

7. The computer-implemented method of claim 5, further comprising continuously maintaining the fixed reference location if the binding annotation is updated.

8. The computer-implemented method of claim 5, wherein the binding annotation is updated as necessitated.

9. The computer-implemented method of claim 5, wherein each of the statement frontier and binding annotations serve as another compiler internal statement of the source code statements.

10. A system comprising:

a processing device communicably coupled to a memory; and a compiler executable from the memory by the processing device, the compiler having an annotation allocator to:
generate a plurality of statement frontier annotations during translation of source code statements of a software program executable by the processing device for a compilation process;
allocate the plurality of statement frontier annotations to the source code statements, wherein each of the plurality of statement frontier annotations comprises information indicating at least one of a beginning or an end of a source code statement to which the statement frontier annotation is allocated; and
allocate binding annotations to the source code statements during the translation of the source code statements, wherein the plurality of statement frontier annotations are fixed in location with respect to the information and corresponding binding annotations during the compilation process comprising at least one of amending or updating the corresponding binding annotation.

11. The system of claim 10, wherein each of the plurality of statement frontier annotations comprises a beginning-of-statement annotation or an end-of-statement annotation.

12. The system of claim 11, wherein the beginning-of-statement annotation indicates the beginning.

13. The system of claim 11, wherein the end-of-statement annotation indicates the end.

14. The system of claim 10, wherein the allocating comprises establishing a fixed reference location between a statement frontier annotation and the corresponding binding annotation of a source code statement to which the statement frontier annotation and the binding annotation are allocated.

15. The system of claim 14, wherein the annotation allocator is further to maintain the fixed reference location by preventing the corresponding binding annotation from moving about with reference to the statement frontier annotation, while other compiler internal statements of the source code statement move about.

16. A non-transitory machine-readable storage medium including data that, when accessed by a processing device, cause the processing device to perform operations comprising:

generating, by the processing device, a plurality of statement frontier annotations during translation of source code statements of a software program executable by processing device for compilation process;

allocating, by the processing device, the plurality of statement frontier annotations to the source code statements, wherein each of the plurality of statement frontier annotations comprises information indicating at least one of a beginning or an end of a source code statement to which the statement frontier annotation is allocated; and allocating, by the processing device, binding annotations to the source code statements during the translation of the source code statements, wherein the plurality of statement frontier annotations are fixed in location with respect to the information and corresponding binding annotations during the compilation process comprising at least one of amending or updating the corresponding binding annotation.

17. The non-transitory machine-readable storage medium of claim 16, wherein each of the plurality of statement frontier annotations comprises a beginning-of-statement annotation or an end-of-statement annotation.

18. The non-transitory machine-readable storage medium of claim 17, wherein the beginning-of-statement annotation indicates the beginning.

19. The non-transitory machine-readable storage medium of claim 17, wherein the end-of-statement annotation indicates the end.

20. The non-transitory machine-readable storage medium of claim 16, wherein the allocating comprises establishing a fixed reference location between a statement frontier annotation and corresponding binding annotation of a source code statement to which the statement frontier annotation and the binding annotation are allocated.

* * * * *